United States Patent Office 3,726,891
Patented Apr. 10, 1973

3,726,891
FUSED 1,2,4-THIADIAZOLINES
Kurt H. Pilgram and Richard D. Skiles, Modesto, Calif., assignors to Shell Oil Company, New York, N.Y.
No Drawing. Filed Dec. 2, 1970, Ser. No. 94,590
Int. Cl. C07d 19/02
U.S. Cl. 260—306.7            4 Claims

ABSTRACT OF THE DISCLOSURE

Novel fused 1,2,4-thiadiazolines, their preparation and use as herbicides.

BACKGROUND OF THE INVENTION

Field of the invention

This invention relates to novel fused heterocyclic compounds wherein one of the fused heterocyclic rings is a 1,2,4-thiadiazoline moiety having the following general structure

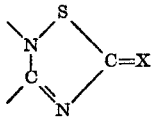

wherein X is oxygen, sulfur or imino. These novel compounds have shown utility as herbicides.

Description of the prior art

Fused heterocyclic ring systems containing as one of the heterocyclic members a thiadiazoline moiety of the above structure are novel. 1,2,4-thiadiazolines as simple heterocyclic structures such as substituted 1,2,4-thiadiazolin-5-ones are known, e.g., U.S. Pat. 3,287,464.

SUMMARY OF THE INVENTION

A new class of compounds characterized by a unique fused heterocyclic ring system, wherein one of the fused rings is a thiadiazoline moiety having the general structure

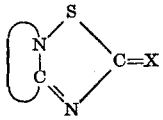

wherein X is oxygen, sulfur or imino, with the other cyclic moiety of the fused system being an optionally substituted 5- or 6-membered heterocycle containing carbon together with one or more of nitrogen, oxygen and/or sulfur, have been discovered. These compounds have shown activity as herbicides.

Also disclosed and within the scope of this invention is a novel process for preparing compounds which possess the unique, fused heterocyclic ring system characteristic of the compounds of this invention.

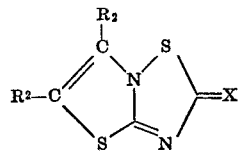

2H-thiazolo(3,2-b)(1,2,4)thiadiazole
IV

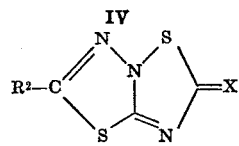

2H-(1,3,4)thiadiazolo(3,2-b)(1,2,4)thiadiazole
VI

DESCRIPTION OF THE PREFERRED EMBODIMENT

The novel compounds of this invention can be described by the general Formulas I-III below:

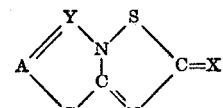  (I)

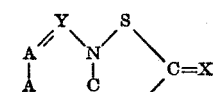  (II)

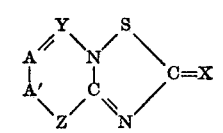  (III)

wherein X represents oxygen, sulfur or =NR$^1$ wherein R$^1$ is hydrogen or alkyl of up to 4 carbon atoms; Y is nitrogen or

wherein R$^2$ is hydrogen, alkyl of up to 4 carbon atoms, halogen, alkoxy of up to 4 carbon atoms, alkylthio of up to 4 carbon atoms, alkylsulfinyl of up to 4 carbon atoms, alkylsulfonyl of up to 4 carbon atoms or —N(R$^3$)$_2$ wherein R$^3$ is hydrogen or alkyl of up to 4 carbon atoms; A is

wherein R$^2$ is as defined above; Z is oxygen sulfur,

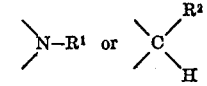

wherein R$^1$ and R$^2$ are as defined above; A' is

wherein R$^2$ is as defined above and Z' is nitrogen or

wherein R$^2$ is as defined above. Any of these alkyl groups can be either branched-chain or straight-chain configuration.

More specifically, structures possessing this novel fused heterocyclic ring system, and therefore within the class of the invention, can be delineated as follows:

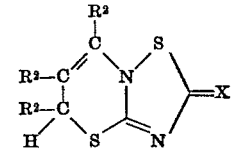

2H,5H-thiazino(3,2-b)(1,2,4)thiadiazole
V

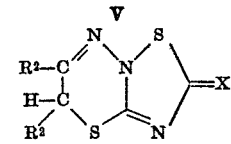

2H,5H-(1,3,4)thiadiazino(3,2-b)(1,2,4)thiadiazole
VII

3

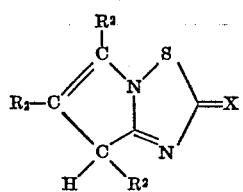

2,4-dihydropyrrolo(1,2-b)(1,2,4)thiadiazole
VIII

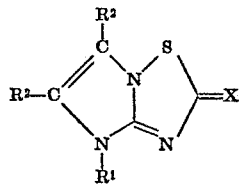

2,4-dihydroimidazo(1,2-b)(1,2,4)thiadiazole
X

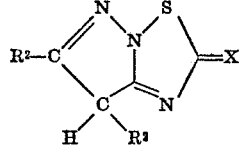

2,4-dihydropyrazolo(2,3-b)(1,2,4)thiadiazole
XII

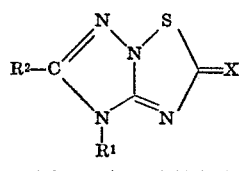

2,4-dihydro-as-triazolo(2,3-b)(1,2,4)thiadiazole
XIV

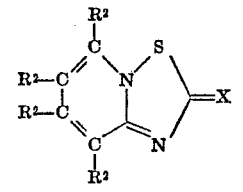

2H-pyrido(1,2-b)(1,2,4)thiadiazole
XVI

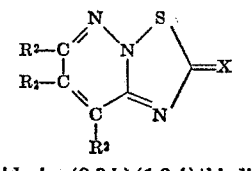

2H-pyridazino(2,3-b)(1,2,4)thiadiazole
XVIII

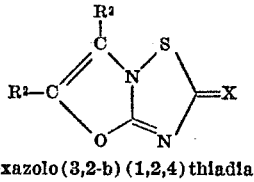

2H-oxazolo(3,2-b)(1,2,4)thiadiazole
XX

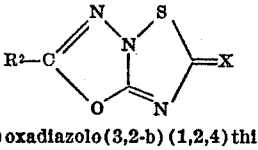

2H-(1,3,4)oxadiazolo(3,2-b)(1,2,4)thiadiazole
XXII wherein X, R¹ and R² are as defined above.

4

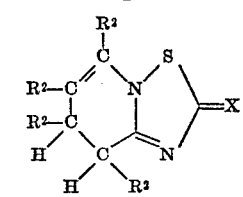

4,5-dihydro-2H-pyrido(1,2-b)(1,2,4)thiadiazole
IX

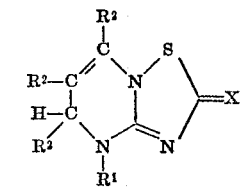

4,5-dihydro-2H-pyrimido(1,2-b)(1,2,4)thiadiazole
XI

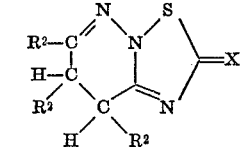

4,5-dihydro-2H-pyridazino(2,3-b)(1,2,4)thiadiazole
XIII

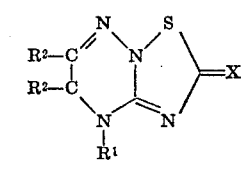

4,5-dihydro-2H-as-triazino(2,3-b)(1,2,4)thiadiazole
XV

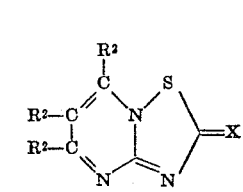

2H-pyrimido(1,2-b)(1,2,4)thiadiazole
XVII

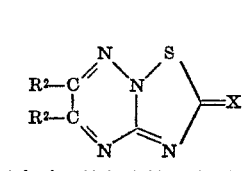

2H-as-triazino(2,3-b)(1,2,4)thiadiazole
XIX

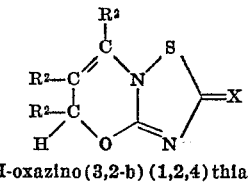

2H,5H-oxazino(3,2-b)(1,2,4)thiadiazole
XXI

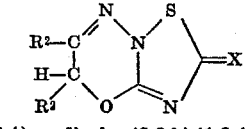

2H,5H-(1,3,4)oxadiazino(3,2-b)(1,2,4)thiadiazole
XXIII

Examples of the general formula, as exemplified by the sub-generic structures IV to XIX above, would include:

2,4-dihydropyrrolo(1,2-b)(1,2,4)thiadiazol-2-one
2,4-dihydropyrrolo(1,2-b)(1,2,4)thiadiazol-2-thione
2,4-dihydropyrrolo(1,2-b)(1,2,4)thiadiazol-2-imine
5-ethyl-2,4-dihydropyrrolo(1,2-b)(1,2,4)thiadiazol-2-one
5-(methylthio)-2,4-dihydropyrrolo(1,2-b)(1,2,4)thiadiazol-2-one
5-(ethylsulfonyl)-2,4-dihydropyrrolo(1,2-b)(1,2,4)thiadiazol-2-one
5-chloro-2,4-dihydropyrrolo(1,2-b)(1,2,4)thiadiazol-2-one
5-bromo-2,4-dihydropyrrolo(1,2-b)(1,2,4)thiadiazol-2-one
5-methoxy-2,4-dihydropyrrolo(1,2-b)(1,2,4)thiadiazol-2-one
2-(ethylamino)-2,4-dihydropyrrolo(1,2-b)(1,2,4)thiadiazol-2-one
5-chloro-6-methyl-2,4-dihydropyrrolo(1,2-b)(1,2,4)thiadiazol-2-one
5-(methylsulfinyl)-6-methyl-1,2,4-dihydropyrrolo(1,2-6)(1,2,4)-thiadiazol-2-one
2,4-dihydroimidazo(1,2-b)(1,2,4)thiadiazol-2-one
2,4-dihydroimidazo(1,2-b)(1,2,4)thiadiazol-2-thione
2,4-dihydroimidazo(1,2-b)(1,2,4)thiadiazol-2-imine
5-ethyl-2,4-dihydroimidazo(1,2-b)(1,2,4)thiadiazol-2-one
5-(methylthio)-2,4-dihydroimidazo(1,2-b)(1,2,4)thiadiazol-2-one
5-(ethylsulfonyl)-2,4-dihydroimidazo-1,2-b)(1,2,4)thiadiazol-2-one
5-chloro-2,4-dihydroimidazo(1,2-b)(1,2,4)thiadiazol-2-one
5-bromo-2,4-dihydroimidazo(1,2-b)(1,2,4)thiadiazol-2-one
5-methoxy-2,4-dihydroimidazo-1,2-b)(1,2,4)thiadiazol-2-one
5-(ethylamino)-2,4-dihydroimidazo-1,2-b)(1,2,4)thiadiazol-2-one
5-chloro-6-methyl-2,4-dihydroimidazo(1,2-b)(1,2,4)thiadiazol-2-one
5-(methylsulfinyl)-6-methyl-2,4-dihydroimidazo(1,2-b)(1,2,4)thiadiazol-2-one
4-methyl-5-chloro-2,4-dihydroimidazo(1,2-b)(1,2,4)thiadiazol-2-one
4-methyl-5-(methylthio)-2,4-dihydroimidazo(1,2-b)(1,2,4)thiadiazol-2-one
2,4-dihydropyrazolo(2,3-b)(1,2,4)thiadiazol-2-one
2,4-dihydropyrazolo(2,3-b(1,2,4)thiadiazol-2-one
2,4-dihydropyrazolo(2,3-b)(1,2,4)thiadiazol-2-one
5-ethyl-2,4-dihydropyrazolo(2,3-b)(1,2,4)thiadiazol-2-one
5-(methylthio)-2,4-dihydropyrazolo(2,3-b)(1,2,4)thiadiazol-2-one
5-(ethylsulfonyl)-2,4-dihydropyrazolo(2,3-b)(1,2,4)thiadiazol-2-one
5-chloro-2,4-dihydropyrazolo(2,3-b)(1,2,4-thiadiazol-2-one
5-bromo-2,4-dihydropyrazolo(2,3-b(1,2,4)thiadiazol-2-one
5-methoxy-2,4-dihydropyrazolo(2,3-b)(1,2,4-thiadiazol-2-one
5-(ethylamino)-2,4-dihydropyrazolo(2,3-b(1,2,4)thiadiazol-2-one
4-methyl-5-chloro-2,4-dihydropyrazolo(2,3-b)(1,2,4)thiadiazol-2-one
4-methyl-5-(methylsulfinyl)-2,4-dihydropyrazolo(2,3-b)(1,2,4-thiadiazol-2-one
2,4-dihydro-as-triazolo(2,3-b)(1,2,4-thiadiazol-2-one
2,4-dihydro-as-triazolo(2,3-b)(1,2,4-thiadiazol-2-thione
2,4-dihydro-as-triazolo(2,3-b)(1,2,4)thiadiazol-2-imine
5-ethyl-2,4-dihydro-as-thiazolo(2,3-b)(1,2,4)thiadiazol-2-one
5-(methylthio)-2,4-dihydro-as-triazolo(2,3-b)(1,2,4)thiadiazol-2-one
5-(ethylsulfonyl)-2,4-dihydro-as-triazolo(2,3-b)(1,2,4)thiadiazol-2-one
5-chloro-2,4-dihydro-as-triazolo(2,3-b)(1,2,4)thiadiazol-2-one
5-bromo-2,4-dihydro-as-triazolo(2,3-b)(1,2,4-thiabiazol-2-one
5-methoxy-2,4-dihydro-as-triazolo(2,3-b)(1,2,4)thiadiazol-2-one
5-(ethylamino)-2,4-dihydro-as-triazolo(2,3-b)(1,2,4)thiadiazol-2-one
4-methyl-5-chloro-2,4-dihydro-as-triazolo(2,3-b)(1,2,4)thiadiazol-2-one
4-methyl-5-(methylsulfinyl)-2,4-dihydro-as-triazolo(2,3-b)(1,2,4)thiadiazol-2-one
2H-thiazolo(3,2-b)(1,2,4)thiadiazol-2-one
2H-thiazolo(3,2-b)(1,2,4)thiadiazol-2-thione
2H-thiazolo(3,2-b)(1,2,4)thiadiazol-2-imine
5-ethyl-2H-(1,3,4)thiadiazolo(3,2-b)(1,2,4)thiadiazol-2-one
5-(methylthio)-2H)thiazolo(3,2-b)(1,2,4)thiadiazol-2-one
5-(ethylsulfonyl)-2H-thiazolo(3,2-b)(1,2,4)thiadiazol-2-one
5-chloro-2H-thiazolo(3,2-b)(1,2,4)thiadiazol-2-one
5-bromo-2H-thiazolo(3,2-b)(1,2,4)thiadiazol-2-one
5-methoxy-2H-thiazolo(3,2-b)(1,2,4)thiadiazol-2-one
5-(ethylamino)-2H-thiazolo(3,2-b)(1,2,4)thiadiazol-2-one
5-chloro-6-methyl-2H-thiazolo(3,2-b)(1,2,4)thiadiazol-2-one
5-(methylsulfinyl)-6-methyl-2H-thiazolo(3,2-b)(1,2,4 thiadiazol-2-one
2H-(1,3,4)thiadiazolo(3,2-b)(1,2,4)thiadiazol-2-one
2H-(1,3,4)thiadiazolo(3,2-b)(1,2,4)thiadiazol-2-thione
2H-(1,3,4)thiadiazolo(3,2-b)(1,2,4)thiadiazol-2-imine
5-ethyl-2H-(1,3,4)thiadiazolo(3,2-b)(1,24)thiadiazol-2-one
5-(methylthio)-2H-(1,3,4)thiadiazolo(3,2-b)(1,2,4)thiadiazol-2-one
5-(ethylsulfonyl)-2H-(1,3,4)thiadiazolo(3,2-b)(1,2,4)thiadiazol-2-one
5-chloro-2H-(1,3,4)thiadiazolo(3,2-b)(1,2,4)thiadiazol-2-one
5-bromo-2H-(1,3,4)thiadiazolo(3,2-b)thiadiazol-2-one
5-methoxy-2H-(1,3,4)thiadiazolo(3,2-b)(1,2,4)thiadiazol-2-one
5-(ethylamino)-2H-(1,3,4)thiadiazolo(3,2-b)(1,2,4)thiadiazol-2-one
2H-pyridino(1,2-b)(1,2,4)thiadiazol-2-one
2H-pyridino(1,2-b)(1,2,4)thiadiazol-2-thione
2H-pyridino(1,2-b)(1,2,4)thiadiazol-2-imine
5-ethyl-2H-pyridino(1,2-b)(1,2,4)thiadiazol-2-one
5-(methylhtio)2H-pyridino(1,2-b)(1,2,4)thiadiazol-2-one
5-(ethylsulfonyl)-2H-pyridino(1,2-b)(1,2,4)thiadiazol-2-one
5-chloro-2H-pyridino(1,2-b)(1,2,4)thiadiazol-2-one
5-bromo-2H-pyridino1,2-b)(1,2,4)thiadiazol-2-one
5-methoxy-2H-pyridino(1,2-b)(1,2,4)thiadiazol-2-one
5-(ethylamino)-2H-pyridino(1,2-b)(1,2,4)thiadiazol-2-one
5-chloro-6-methyl-2H-pyridino(1,2-b)(1,2,4)thiadiazol 2-one
5-(methylsulfinyl)-6-methyl-2H-pyridino(1,2-b)(1,2,4)thiadiazol-2-one
2H-pyridazino(2,3-b)(1,2,4)thiadiazol-2-one
2H-pyridazino(2,3-b)(1,2,4)thiadiozol-2-thione
2H-pyridazino(2,3-b)(1,2,4)thiadiazol-2-imine
5-ethyl-2H-pyridazino(2,3-b)(1,2,4)thiadiazol-2-one
5-(methylthio)-2H-pyridazino(2,3-b(1,2,4)thiadiazol-2-one
5-(ethylsulfonyl)-2H-pyridazino(2,3-b)(1,2,4)thiadiazol-2-one
5-chloro-2H-pyridazino(2,3-b)(1,2,4)thiadiazol-2-one 5-bromo-2H-pyridazino(2,3-b)(1,2,4)thiadiazol-2-one
5-methoxy-2H-pyridazino(2,3-b)(1,2,4)thiadiazol-2-one
5-(ethylamino)-2H-pyridazino(2,3-b(1,2,4)thiadiazol-2-one
5-chloro-6-methyl-2H-pyridazino(2,3-b)(1,2,4)thiadiazol-2-one
5-(methylsulfinyl)-6-methyl-2H-pyridazino(2,3-b)(1,2,4)thiadiazol-2-one
2H-as-triazino(2,3-b)(1,2,4)thiadiazol-2-one
2H-as-triazino(2,3-b)(1,2,4)thiadiazol-2-thione
2H-as-triazino(2,3-b)(1,2,4)thiadiazol-2-imine
5-ethyl-2H-as-triazino(2,3-b)(1,2,4)thiadiazol-2-one
5-(methylthio)-2H-as-triazino(2,3-b)(1,2,4)thiadiazol-2-one
5-(ethylsulfonyl)-2H-as-triazino(2,3-b)(1,2,4)thiadiazol-2-one
5-chloro-2H-as-triazino(2,3-b)(1,2,4)thiadiazol-2-one
5-bromo-2H-as-triazino(2,3-b)(1,2,4)thiadiazol-2-one
5-methoxy-2H-as-triazino(2,3-b)(1,2,4)thiadiazol-2-one
5-(ethylamino)-2H-as-triazino(2,3-b)(1,2,4)thiadiazol-2-one
5-chloro-6-methyl-2H-as-triazino(2,3-b)(1,2,4)thiadiazol-2-one
5-(methylsulfinyl)-6-methyl-2H-as-triazino(2,3-b)(1,2,4)thiadiazol-2-one
4,5-dihydro-2H-pyridazino(2,3-b)(1,2,4)thiadiazol-2-one
4,5-dihydro-2H-pyridazino(2,3-b)(1,2,4)thiadiazol-2-thione
4,5-dihydro-2H-pyridazino(2,3-b)(1,2,4)thiadiazol-2-imine
5-ethyl-4,5-dihydro-2H-pyridazino(2,3-b)(1,2,4)thiadiazol-2-one
5-(methylthio)-4,5-dihydro-2H-pyradazino(2,3-b)-(1,2,4)-thiadiazol-2-one
5-(ethylsulfonyl)-4,5-dihydro-2H-pyridazino(2,3-b)-(1,2,4)-thiadiazol-2-one
5-chloro-4,5-dihydro-2H-pyridazino(2,3-b)(1,2,4)thiadiazol-2-one
5-bromo-4,5-dihydro-2H-pyridazino(2,3-b)(1,2,4)thiadiazol-2-one
5-methoxy-4,5-dihydro-2H-pyridazino(2,3-b)(1,2,4)thiadiazol-2-one
5-(ethylamino)-4,5-dihydro-2H-pyridazino(2,3-b)(1,2,4)thiadiazol-2-one
5-chloro-6-methyl-4,5-dihydro-2H-pyridazino(2,3-b)-(1,2,4)thiadiazol-2-one
5-(methylsulfinyl)-6-methyl-4,5-dihydro-2H-pyridazino-(2,3-b)(1,2,4)thiadiazol-2-one
4,5-dihydro-2H-pyrimido(1,2-b)(1,2,4)thiadiazol-2-one
4,5-dihydro-2H-pyrimido(1,2-b)(1,2,4)thiadiazol-2-thione
4,5-dihydro-2H-pyrimido(1,2-b)(1,2,4)thiadiazol-2-imine
5-ethyl-4,5-dihydro-2H-pyrimido(1,2,-b)(1,2,4)thiadiazol-2-one
5-(methylthio)-4,5-dihydro-2H-pyrimido(1,2-b)(1,2,4)thiadiazol-2-one
5-(ethylsulfonyl)-4,5-dihydro-2H-pyrimido(1,2-b)-(1,2,4)thiadiazol-2-one
5-chloro-4,5-dihydro-2H-pyrimido(1,2-b)(1,2,4)thiadiazol-2-one
5-bromo-4,5-dihydro-2,4-pyrimido(1,2-b)(1,2,4)thiadiazol-2-one
5-methoxy-4,5-dihydro-2H-pyrimido(1,2-b)(1,2,4)thiadiazol-2-one
5-(ethylamino)-4,5-dihydro-2H-pyrimido(1,2-b)(1,2,4)thiadiazol-2-one
5-chloro-6-methyl-4,5-dihydro-2H-pyrimido(1,2-b)-(1,2,4)-thiadiazol-2-one
5-(methylsulfinyl)-6-methyl-4,5-dihydro-2H-pyrimido-(1,2-b)(1,2,4)thiadiazol-2-one
4,5-dihydro-2H-pyridino(1,2-b)(1,2,5)thiadiazol-2-one
4,5-dihydro-2H-pyridino(1,2-b)(1,2,4)thiadiazol-2-thione
4,5-dihydro-2H-pyridino(1,2-b)(1,2,4)thiadiazol-2-thione
5-ethyl-4,5-dihydro-2H-pyridino(1,2-b)(1,2,4)thiadiazol-2-one
5-(methylthio)-4,5-dihydro-2H-pyridino(1,2-b)(1,2,4)thiadiazol-2-one
5-(ethylsulfonyl)-4,5-dihydro-2H-pyridino(1,2-b)(1,2,4)thiadiazol-2-one
5-chloro-4,5-dihydro-2H-pyridino(1,2-b)(1,2,4)thiadiazol-2-one
5-bromo-4,5-dihydro-2H-pyridino(1,2-b)(1,2,4)thiadiazol-2-one
5-methoxy-4,5-dihydro-2H-pyridino(1,2-b)(1,2,4)thiadiazol-2-one
5-(ethylamino)-4,5-dihydro-2H-pyridino(1,2-b)(1,2,4)thiadiazol-2-one
5-chloro-6-methyl-4,5-dihydro-2H-pyridino(1,2-b)(1,2,4)thiadiazol-2-one
5-(methylsulfinyl)-6-methyl-4,5-dihydro-2H-pyridino-(1,2-b)(1,2,4)thiadiazol-2-one
2H,5H-thiazino(3,2-b)(1,2,4)thiadiazol-2-one
2H,5H-thiazino(3,2-b)(1,2,4)thiadiazol-2-thione
2H,5H-thiazino(3,2-b)(1,2,4)thiadiazol-2-imine
5-ethyl-2H,5H-thiazino(3,2-b)(1,2,4)thiadiazol-2-one
5-(methylthio)-2H,5H-thiazino(3,2-b)·(1,2,4)thiadiazol-2-one
5-(ethylsulfonyl)-2H,5H-thiazino(3,2-b)(1,2,4)thiadiazol-2-one
5-chloro-2H,5H-thiazino(3,2-b)(1,2,4)thiadiazol-2-one
5-bromo-2H,5H-thiazino(3,2-b)(1,2,4)thiadiazol-2-one
5-methoxy-2H,5H-thiazino(3,2-b)(1,2,4)thiadiazol-2-one
5-(ethylamino)-2H,5H-thiazino(3,2-b)(1,2,4)thiadiazol-2-one
5-chloro-6-methyl-2H,5H-thiazino(3,2-b)(1,2,4)thiadiazol-2-one
5-(methylsulfinyl)-6-methyl-2H,5H-thiazino(3,2-b)-(1,2,4)thiadiazol-2-one
2H,5H-(1,3,4)thiadiazino(3,2-b)(1,2,4)(thiadiazol-2-one
2H,5H-(1,3,4)thiadiazino(3,2-b)(1,2,4)thiadiazol-2-thione
2H,5H-(1,3,4)thiadiazino(3,2-b)(1,2,4)thiadiazol-2-imine
3-(methylsulfonyl)-2H,5H-(1,3,4)thiadiazino(3,2-b)-(1,2,4)thiadiazol-2-one
3-chloro-2H,5H-(1,3,4)thiadiazino(3,2-b)(1,2,4)thiadiazol-2-one
3-ethyl-2H,5H-(1,3,4)thiadiazino(3,2-b)(1,2,4)thiadiazol-2-one
4,5-dihydro-2H-as-triazino(2,3-b)(1,2,4)thiadiazol-2-one
4,5-dihydro-2H-as-triazino(2,3-b)(1,2,4)thiadiazol-2-thione
4,5-dihydro-2H-as-triazino(2,3-b)(1,2,4)thiadiazol-2-imine
5-(methylthio)-4,5-dihydro-2H-as-triazino(2,3-b)(1,2,4)thiadiazol-2-one
2H-pyrimido(1,2-b)(1,2,4)thiadiazol-2-one
2H-pyrimido(1,2-b)·(1,2,4)thiadiazol-2-thione
2H-pyrimido(1,2-b)(1,2,4)thiadiazol-2-imine
5-(methylsulfonyl)-2H-pyrimido(1,2-b)(1,2,4)thiadiazol-2-one
2H-oxazolo(3,2-b)(1,2,4)thiadiazol-2-one
2H-oxazolo(3,2-b)(1,2,4)thiadiazol-2-thione
2H-oxazolo(3,2-b)(1,2,4)thiadiazol-2-imine
5-(ethylsulfonyl)-2H-oxazolo(3,2-b)(1,2,4)thiadiazol-2-one
2H,5H-oxazino(3,2-b)(1,2,4)thiadiazol-2-one
5-(methylthio)-2H,5H-oxazino(3,2-b)(1,2,4)thiadiazol-2-one
2H-(1,3,4)oxadiazolo(3,2-b)(1,2,4)thiadiazol-2-one
5-(ethylsulfonyl-2H-(1,3,4)oxadiazolo(3,2-b)(1,2,4)-thiadiazol-2-one.
2H,5H-(1,3,4)oxadiazino(3,2-b)(1,2,4)thiadiazol-2-one
5-(methylthio)-2H,5H,(1,3,4)oxadiazino(3,2-b)(1,2,4)thiadiazol-2-one Preferred because of their herbicidal activity are compounds of Formula I above wherein X is oxygen; Y is nitrogen or A is

A is

and Z is sulfur, R² in all cases being as defined above or compounds of the Formula II above wherein X is oxygen; Y is nitrogen, A and Z' are

wherein R² is as defined above. These preferred subclasses correspond to and are best represented by the subgeneric structures IV, VI and XVIII above. Preferred species of these subclasses include compounds wherein X is oxygen and R² is hydrogen, alkyl of up to 4 carbon atoms, chlorine, alkylthio of up to 4 carbon atoms or alkylsulfonyl of up to 4 carbon atoms with the proviso that in compounds having multiple R² substituents, the number of R² groups which are other than hydrogen or alkyl does not exceed one.

Specific examples of this preferred subclass include:

4-methyl-5-(ethylthio)-2H-thiazolo(3,2-b)(1,2,4)thiadiazol-2-one
5-chloro-2H-thiazolo(3,2-b)(1,2,4)thiadiazol-2-one
2H-(1,3,4)thiadiazolo(3,2-b)(1,2,4)thiadiazol-2-one
5-(methylthio)-2H-(1,3,4)thiadiazolo(3,2-b)(1,2,4)thiadiazol-2-one
6-chloro-2H-pyridazino(2,3-b)(1,2,4)thiadiazol-2-one
6-(methylsulfonyl)-2H-pyridazino(2,3-b)(1,2,4)thiadiazol-2-one
5-(methylsulfonyl)-2H-thiazolo(3,2-b)(1,2,4)thiadiazol-2-one
5-(ethylsulfonyl)-2H-(1,3,4)thiadiazolo(3,2-b)(1,2,4)thiadiazol-2-one
5-(2-methylpropyl)-2H-thiazolo(3,2-b)(1,2,4)thiadiazol-2-one
5-ethyl-2H-(1,3,4)thiadiazolo(3,2-b)(1,2,4)thiadiazol-2-one The compounds of the invention are solid at ambient temperature. They may be suitably formulated for use as herbicides, as wettable powders, dusts, granules, solutions, emulsifiable concentrates, emulsions and pastes. Wettable powders are usually compounded to contain 25, 50, 75 or up to 85% of toxicant and usually contain, in addition to solid carrier, 3-10% of a dispersing agent and, where necessary, 0-10% of stabilizer(s) and/or other additives such as penetrants or stickers. Dusts are usually formulated as a dust concentrate having a similar composition to that of a wettable powder but without a dispersant, and are diluted in the field with further solid carrier to give a composition usually containing 0.5-10% of toxicant. Granules are usually prepared to have a size between 10 and 100 BS mesh, and may be manufactured by agglomeration or impregnation techniques. Generally, granules will contain 0.5-25% of toxicant plus additives such as stabilizers, slow-release modifiers, binding agents, etc. Emulsifiable concentrates usually contain, in addition to the solvent, and, when necessary, co-solvent, 10-50% s./v. toxicant, 2-20% w./v. emulsifiers and 0-20% of appropriate additives such ts stabilizers, penetrants and corrosion inhibitors. Pastes are compounded so as to obtain a stable flowable product and usually contain 10-60% toxicant, 2-20% of appropriate additives and, as carrier, water or an organic liquid in which the toxicant is substantially insoluble. Except where indicated otherwise, all percentages given in this paragraph are percentages by weight.

The compounds of this invention as defined by the general Formulas I, II and III above may be prepared by a novel process, which in its broadest scope is applicable not only to the production of the fused heterocyclic compounds of this invention, but also provides a means of synthesizing a number of other derivatives (including simple heterocyclic compounds) of the heretofore unknown heterocyclic structure

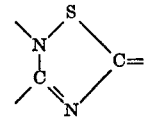

This process, which forms a further feature of the invention, involves the reaction of chlorocarbonylsulfenyl chloride with a urea derivative of the formula

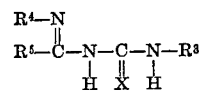

wherein for the production of the fused heterocyclic compounds of this invention X is as defined above; R³ is hydrogen or lower alkyl; R⁴ and R⁵ taken together form a cyclic bridge represented by —Y=A—Z—, —Y=A—A=Z'— or —Y=A—A'—Z— in the general Formulas I, II and III above. More graphically, the urea derivatives utilized in the production of the compounds of the invention, according to the process of the invention are simple heterocyclic compounds substituted on a ring carbon with a ureido-type moiety as described by the formulas

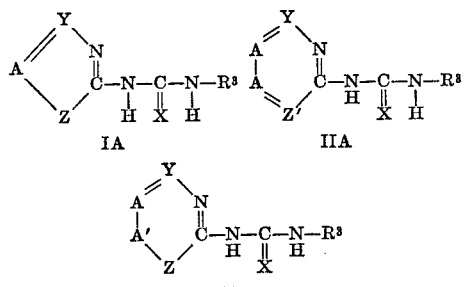

wherein Y, A, A', Z, Z', X and R³ are as defined above, dependent on whether products of the above defined general Formulas I, II or III, respectively, are desired. The compounds defined by the Formulas IA, IIA and IIIA above are known compounds, being ureido, thioureido or guanidino derivatives of alphamino nitrogen heterocyclic compounds and may be prepared by known techniques e.g., reaction of an isocyanate, isothiocyanate or cyanamide with the appropriate heterocyclic amine.

As noted above, this reaction also provides a viable means of synthesizing a number of other derivatives of the heterocyclic structure

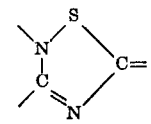

which may be accomplished simply by varying the nature of the R⁴ and R⁵ substituents on the urea reactant. For example, if R⁴ and R⁵ each are hydrogen, alkyl aryl, aralkyl or alkaryl groups and X and R³ are as defined above, the products of the reaction would be 1,2,4-thiadiazolin-2(2H)-ones, -thiones or -imines as simple heterocyclic structures substituted in the 4 and 5 positions on the ring with the appropriate moieties as described for the R⁴ and R⁵ substituents on the urea reactant. These acyclic urea-type reactants which may be more appropriately identified as N-carbamoyl amidines are known compounds [see R. L. Shriner and Fred W. Neumann, "The Chemistry of the Amidines," Chemical Reviews, 35, 416–417 (1944)].

The reaction in its most general terms proceeds according to the following equation

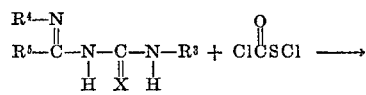
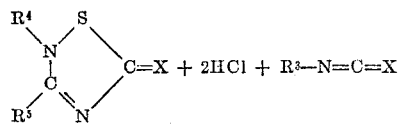

with the reaction by-products being hydrogen chloride gas and isocyanic acid or an alkyl isocyanate. The reaction may be suitably carried out in any unsubstituted or halogenated aliphatic or aromatic hydrocarbon solvent which is inert to reaction with chlorocarbonylsulfenyl chloride under the reaction conditions used. Solvents which have been found to be suitable include benzene, toluene, p-dioxane and aliphatic and aromatic ethers. The reaction may optionally be carried out in the presence of an acid scavenger such as pyridine or other tertiary amines to accept the hydrogen chloride which is liberated during the reaction. The ring closure reaction has been found to take place at any temperature from 20° C. up to the reflux temperature of the solvent utilized. Thus any reaction temperature within that range is suitable; however, the lower temperatures are accompanied by slower rates of reaction and therefore the higher temperatures 80° to reflux, are preferred. At reflux temperatures the reaction is ordinarily completed in 1–18 hours. The relative quantities of reactants charged to the reaction is not critical; a 1 to 1 molar ratio of reactants has been commonly employed and found to be quite suitable, although there may be instances where it would be desirable to use an excess of chlorocarbonylsulfenyl chloride to drive the reaction.

The 1,2,4-thiadiazoline product may be recovered from the reaction product by a variety of conventional methods depending upon the properties of the particular compound. These may include recrystallization from solvents such as lower alkanols or column chromatography.

The compounds of the invention, their preparation using the process of the invention and their herbicidal activity, are illustrated by the following examples, in which parts by weight (w.) and parts by volume (v.) bear the same relation as the kilogram to the liter and all temperatures are in degrees centigrade.

EXAMPLE I 5-(ethylthio)-6-methyl-2H-thiazolo(3,2-b)(1,2,4)thiadiazol-2-one

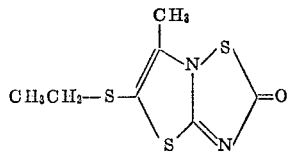

A mixture of 1-(5-ethylthio)-4-methylthiazol-2-yl)-3-methylurea (15.5 w.), xylene (100 v.) and chlorocarbonylsulfenyl chloride (9.7 w.) was heated to reflux for four hours. The reaction evolved hydrogen chloride and turned dark. The solvent was removed by distillation in vacuum to give a black tarry residue. Purification by column chromatography over silica gel (eluent: tetrahydrofuran (2 parts) and hexane (48 parts)) yielded 1.0 g. (6.5%) of light yellow crystalline solid, 5-(ethylthio-4-methyl-2H-thiazolo(3,2-b)(1,2,4)thiadiazol-2-one, (1.0 w.) melting at 78–81°. The structure was confirmed by infrared spectrum, nuclear magnetic resonance, mass spectrometric and elemental analyses.

*Analysis.*—Calculated (percent by weight): C, 36.2; H, 3.4; N, 12.1. Found (percent by weight): C, 36.0; H, 3.6; N, 12.0.

EXAMPLE II 5-chloro-2H-thiazolo(3,2-b)(1,2,4)thiadiazol-2-one

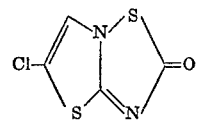

A suspension of 1-(5-chlorothiazol-2-yl)-3-methylurea (9.0 w.) in benzene (100 v.) and chlorocarbonylsulfenyl chloride (6.9 w.) was heated to reflux until hydrogen chloride evolution ceased (18 hours). The solvent was removed by distillation in a vacuum and the residue was recrystallized (with the aid of charcoal) from methanol to yield a colorless crystalline solid, 5-chloro-2H-thiazolo (3,2-b)(1,2,4)thiadiazol-2-one, (4.0 w.) melting at 132–133°. The structure was confirmed by infrared spectrum, nuclear magnetic resonance, mass spectrometric and elemental analyses.

*Analysis.*—Calculated (percent by weight): Cl, 18.4; N, 14.5; S, 33.2. Found (percent by weight): Cl, 18.5; N, 14.8; S, 32.9.

EXAMPLE III 5-(methylthio)-2H-(1,3,4)thiadiazolo(3,2-b)(1,2,4)thiadiazol-2-one

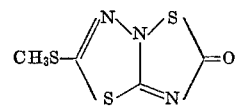

A mixture of 1-(5-(methylthio)-1,3,4-thiadiazol-2-yl)-3-methylurea (8.0 w.), toluene (100 v.) and chlorocarbonylsulfenyl chloride (5.8 w.) was stirred and heated at reflux for 18 hours. The solvent was removed by distillation in a vacuum and the residual solid was recrystallized from methanol to yield a tan solid, 5-(methylthio)-2H-(1,3,4)thiadiazolo(3,2-b)(1,2,4)thiadiazol-2 - one, (5.0 w.) melting at 149–152°. The structure was confirmed by infrared spectrum, nuclear magnetic resonance and elemental analyses.

*Analysis.*—Calculated (percent by weight): N, 20.5; S, 46.8. Found (percent by weight): N, 20.3; S, 46.1.

EXAMPLE IV 2H-(1,3,4)thiadiazolo(3,2-b)(1,2,4)thiadiazol-2-one

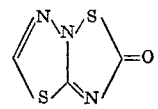

Chlorocarbonylsulfenyl chloride (9.0 w.) was added dropwise to a stirred suspension of 1-methyl-3-(1,3,4-thiadiazol-2-yl)urea (10.0 w.) in p-dioxane (200 v.). The internal temperature rose briefly from 23 to 29° during this addition. The mixture was chilled to 20–25° during the dropwise addition of 12.7 w. of triethylamine. The mixture was heated to 60° for one hour and concentrated to dryness in vacuum. The residue was washed well with water, filtered and recrystallized from methanol to yield a brown solid, 2H-(1,3,4)-thiadiazolo(3,2-b)(1,2,4-)thiadiazol-2-one (2.5 w.), which melted at 210–215° with decomposition. The structure was confirmed by infrared spectrum and elemental analyses.

*Analysis.*—Calculated (percent by weight): C, 22.7; H, 0.63; N, 26.4. Found (percent by weight): C, 23.2; H, 0.95; N, 26.5.

EXAMPLE V 6-chloro-2H-pyridazino(2,3-b)(1,2,4)thiadiazol-2-one

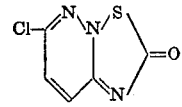

A mixture of 1-(6-chloropyridazin-2-yl)-3-methylurea (15.0 w.), xylene (100 v.) and chlorocarbonylsulfenyl chloride (11.0 w.) was heated to reflux for 18 hours. The solvent was removed by distillation in a vacuum and the residue was decolorized with charcoal and recrystallized from methanol to yield a light yellow crystalline solid, 6-chloro-2H-pyridazino-(2,3 - b)(1,2,4)thiadiazol-2-one, (9.0 w.) melting at 162–165°. The structure was confirmed by infrared spectrum, nuclear magnetic resonance and elemental analyses.

*Analysis.*—Calculated (percent by weight): Cl, 18.9; S, 17.1. Found (percent by weight): Cl, 18.6; S, 17.2.

EXAMPLE VI 6-(methylsulfonyl)-2H-pyridazino(2,3-b)(1,2,4)thiadiazol-2-one

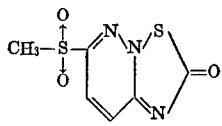

6-chloro-2H-pyridazino(2,3 - b)(1,2,4)thiadiazol-2-one (4.0 w.) prepared as in Example V was charged to a mixture of dimethyl sulfoxide (40 v.) and methyl mercaptan (4.8 w.). This solution was stirred during the dropwise addition of aqueous sodium hydroxide (0.86 w. in 5 v. of water). This addition was exothermic causing the internal temperature to rise to 35°. The reaction mixture was left standing at ambient temperatures for 1.5 hours, poured into ice water, filtered and dried to yield a light gray solid (3.0 w.). The light gray solid was suspended in acetic acid (25 v.) and the suspension was warmed to 50° during the dropwise addition of 30% aqueous hydrogen peroxide. The mixture was heated to 75° and left standing at ambient temperatures for two hours, poured into ice water, filtered, washed with water and dried to yield a light yellow solid, 6-(methylsulfonyl)-2H-pyridazino(2,3-b)(1,2,4)thiadiazol-2-one, (1.0 w.) melting at 183–186°. The structure was confirmed by infrared spectrum and elemental analyses.

*Analysis.*—Calculated (percent by weight): N, 18.2; S, 27.7. Found (percent by weight): N, 17.8; S, 27.4.

EXAMPLE VII

Pre-emergence herbicidal activity of the typical compounds of the invention was evaluated by planting weed seeds in soil held in large test tubes, the soil having been treated with the test compound at the rate of 1 and 10 milligrams of test compound per tube, respectively. Seeds of watergrass (*Echinochloa crusgalli*) and cress (*Lepidium sativum*) were germinated in treated soil under controlled conditions of temperature and light for 12 to 13 days prior to evaluation of the effectiveness of the treatments. At that time, the germination was noted and the treatments were rated on a 0 (no effect) to 9 (all dead) scale. The results are summarized in Table I.

Post-emergence herbicidal activity was evaluated by spraying dilute suspensions of the test compound in a 1:1 mixture of acetone and water with 0.5% wetting agent on crabgrass (*Digitaria sanguinalis*) and pigweed plants (*Amaranthus sp*) grown under controlled conditions at the rates of 1 and 10 pounds test compound per acre. After the plants were held for 10 to 11 days, they were rated for treatment effect on a 0 (no effect) to 9 (total plant kill) scale. The results of these tests are also shown in Table I.

TABLE I

| Compound | Pre-emergence | | | | Post-emergence | | | |
|---|---|---|---|---|---|---|---|---|
| | Watergrass | | Cress | | Crabgrass | | Pigweed | |
| | 1 | 10 | 1 | 10 | 1 | 10 | 1 | 10 |
| 5-chloro-2H-thiazolo(2,3-b)(1,2,4)thiadiazol-2-one | 7 | 9 | 9 | 9 | 4 | 9 | 3 | 9 |
| 5-(ethylthio)-6-methyl-2H-thiazolo(2,3-b)(1,2,4)thiadiazol-2-one | 0 | 0 | 2 | 3 | 0 | 0 | 0 | 1 |
| 2H-(1,3,4)thiadiazolo(3,2-b)(1,2,4)thiadiazol-2-one | 0 | 1 | 1 | 7 | 1 | 5 | 2 | 4 |
| 5-(methylthio)-2H-(1,3,4)thiadiazolo(3,2-b)(1,2,4)thiadiazol-2-one | 1 | 8 | 1 | 9 | 0 | 7 | 0 | 8 |
| 6-chloro-2H-pyridazino(2,3-b)(1,2,4)thiadiazol-2-one | 2 | 4 | 4 | 7 | 0 | 5 | 3 | 9 |
| 6-(methylsulfonyl)-2H-pyridazino(2,3-b)(1,2,4)thiadiazol-2-one | 0 | 8 | 0 | 9 | 0 | 7 | 4 | 9 |

We claim as our invention:

1. A compound of the formula

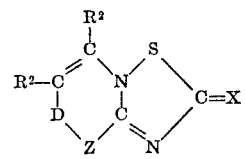

wherein X is oxygen or sulfur, Z is oxygen or sulfur, $R^2$ is hydrogen, alkyl of up to 4 carbon atoms, halogen, alkoxy of up to 4 carbon atoms, alkylthio of up to 4 carbon atoms, alkylsulfinyl of up to 4 carbon atoms, alkylsulfonyl of up to 4 carbon atoms, or —$N(R^3)_2$ wherein $R^3$ is hydrogen or alkyl of up to 4 carbon atoms, and D is

or a single bond.

2. A compound according to claim 1 wherein X is oxygen and Z is sulfur.

3. Compounds according to claim 2 having the formula

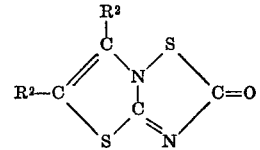

wherein $R^2$ is hydrogen, alkyl of up to 4 carbon atoms, chlorine, alkylthio of up to 4 carbon atoms or alkylsulfonyl of up to 4 carbon atoms with the proviso that at least one of the $R^2$ substituents is hydrogen or alkyl.

4. 5-chloro-2H-thiazolo(3,2-b)(1,2,4)thiadiazol-2-one.

References Cited

UNITED STATES PATENTS

| 2,891,862 | 6/1959 | Van Allan | 260—306.8 F |
| 2,892,838 | 6/1959 | Sprague | 260—302 F |
| 3,574,226 | 4/1971 | Ratz et al. | 260—302 D |

ALEX MAZEL, Primary Examiner

R. J. GALLAGHER, Assistant Examiner

U.S. Cl. X.R.

71—90; 260—243 R, 244 R, 249.5, 250 A, 256.4 N, 256.5 R, 294.8 C, 294.8 E, 295 E, 302 F, 306.8 D, 307 G, 307 R, 308 R, 307, 310 R, 326.3, 326.83